United States Patent
Halttunen et al.

(10) Patent No.: US 12,421,145 B2
(45) Date of Patent: Sep. 23, 2025

(54) METHOD FOR TREATING WASTEWATER

(71) Applicant: Kemira Oyj, Helsinki (FI)

(72) Inventors: Sakari Halttunen, Espoo (FI); Miia Niemelä, Helsinki (FI)

(73) Assignee: Kemira Oyj, Helsinki (FI)

( * ) Notice: Subject to any disclaimer, the term of this patent is extended or adjusted under 35 U.S.C. 154(b) by 710 days.

(21) Appl. No.: 17/779,465

(22) PCT Filed: Nov. 24, 2020

(86) PCT No.: PCT/FI2020/050791
§ 371 (c)(1),
(2) Date: May 24, 2022

(87) PCT Pub. No.: WO2021/105558
PCT Pub. Date: Jun. 3, 2021

(65) Prior Publication Data
US 2022/0402790 A1    Dec. 22, 2022

(30) Foreign Application Priority Data
Nov. 25, 2019    (FI) .................................... 20196011

(51) Int. Cl.
*C02F 1/52*    (2023.01)
*C02F 1/56*    (2023.01)
(Continued)

(52) U.S. Cl.
CPC .......... *C02F 3/1215* (2013.01); *C02F 1/5236* (2013.01); *C02F 1/56* (2013.01);
(Continued)

(58) Field of Classification Search
CPC ...... C02F 1/52; C02F 1/66; C02F 3/12; C02F 2301/046
See application file for complete search history.

(56) References Cited

U.S. PATENT DOCUMENTS

2019/0010066 A1    1/2019    Byers et al.
2019/0194048 A1    6/2019    Wikramanayake et al.

FOREIGN PATENT DOCUMENTS

AU    2008200270 A1    8/2008
CN    102603132 A    3/2012
(Continued)

OTHER PUBLICATIONS

Kang, Yun Whan, and Kyung-Yub Hwang. "Effects of reaction conditions on the oxidation efficiency in the Fenton process." Water research 34.10 (2000): 2786-2790. (Year: 2000).*
(Continued)

*Primary Examiner* — Bradley R Spies
(74) *Attorney, Agent, or Firm* — Meunier Carlin & Curfman LLC

(57) ABSTRACT

The invention relates to a method for treating wastewater in an activated sludge process, which comprises a biological treatment step followed by a sedimentation step for separation of sludge and treated effluent water. The method comprises directing a part of the treated effluent water as a backflow from the sedimentation step to the biological treatment step, the backflow having an original pH value; adjusting the backflow pH from the original pH value to a first pH value between the sedimentation step and the biological treatment step, and adding a coagulant and/or an oxidant to the backflow after the adjustment of the backflow pH to the first pH value and before backflow's entry to the biological treatment step.

14 Claims, 1 Drawing Sheet

(51) Int. Cl.
*C02F 1/66* (2023.01)
*C02F 1/72* (2023.01)
*C02F 3/12* (2023.01)
*C02F 103/28* (2006.01)

(52) U.S. Cl.
CPC .................. *C02F 1/66* (2013.01); *C02F 1/72* (2013.01); *C02F 2103/28* (2013.01); *C02F 2209/08* (2013.01); *C02F 2301/046* (2013.01); *C02F 2305/026* (2013.01)

(56) References Cited

FOREIGN PATENT DOCUMENTS

| | | | |
|---|---|---|---|
| CN | 104556578 A | | 2/2015 |
| EP | 0509152 A1 | | 10/1992 |
| GB | 1405690 | | 9/1975 |
| JP | 55653791 A | | 5/1981 |
| JP | H05269478 A | | 10/1993 |
| JP | H1142401 A | | 2/1999 |
| JP | 2003071487 A | | 3/2002 |
| JP | 2008086848 A | * | 4/2008 |
| WO | 9413591 A1 | | 6/1994 |

OTHER PUBLICATIONS

Suzuki et al—JP 2008-86848A (aka JP2008086848A) machine translation (Year: 2008).*
Rott, Eduard, et al. "Removal of phosphonates from industrial wastewater with UV/FeII, Fenton and UV/Fenton treatment." Water Research 122 (2017): 345-354. (Year: 2017).*
International Search Report and Written Opinion, in connection with International Application No. PCT/FI2020/050791, dated Feb. 9, 2021.
English translation of search report of corresponding Chinese application 202080079030X. Issued on Oct. 23, 2023. 2 pages.
Chinese Search Report issued in connection with corresponding CN application No. 202080079030X, mailed Mar. 27, 2024 with English-language translation (5 pages).
Zhou B., "Power Plant Chemistry", China Electric Power Press, 2003, pp. 43-44 with English-language machine translation (10 pages).
Kou J. et al, "Oilfield Produced Water Treatment", China University Petroleum Press, 2018, pp. 88-89 with English-language machine translation (10 pages).
Lin Y. et al, "Water-based pollution control engineering", Harbin Inst. of Tech. Press, 2010, p. 75 with English-language machine translation (8 pages).

* cited by examiner

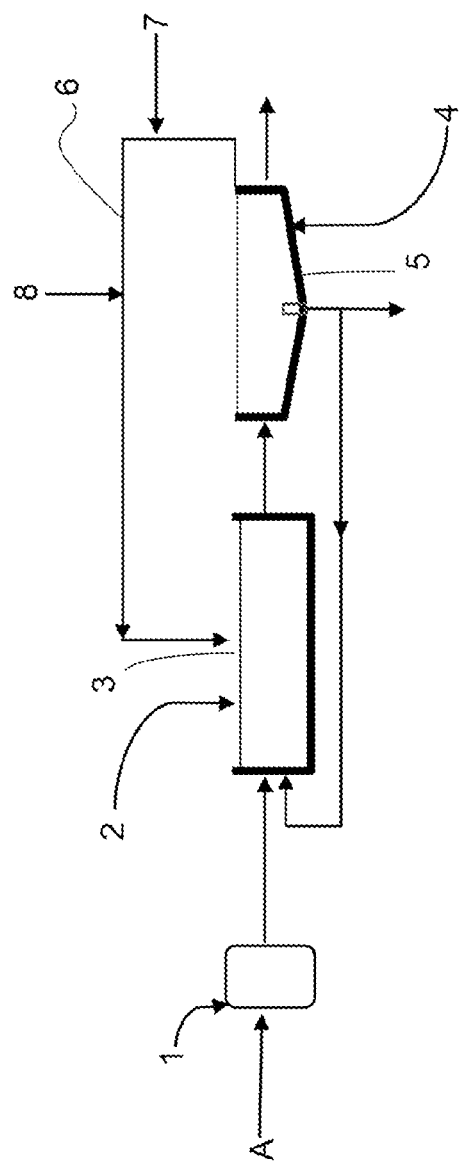

METHOD FOR TREATING WASTEWATER

CROSS REFERENCE TO RELATED APPLICATIONS

This application is a United States National Phase Patent Application of International Patent Application Number PCT/FI2020/050791, filed on Nov. 24, 2020, which claims the benefit of priority to Finnish National Patent Application number FI 20196011, filed on Nov. 25, 2019, both of which are incorporated by reference herein in their entireties.

FIELD OF THE INVENTION

The present invention relates to a method for treating wastewater in an activated sludge process according to the preamble of the enclosed independent claim.

BACKGROUND OF THE INVENTION

Wastewater of municipal and industrial origin is commonly treated in so-called activated sludge processes, where microorganisms are used to remove organic contaminants from the water. An activated sludge process usually comprises a biological treatment step followed by a secondary sedimentation step, where the secondary sludge is separated from the treated water. Part of the separated secondary sludge is usually recycled back to the biological treatment step in order to maintain sufficient biological activity in the process.

Sometimes the treated water from the secondary sedimentation step still contains too high concentration of contaminants, especially organic contaminants, and does not meet the set target levels for treated water. This problem can be solved by introducing a tertiary treatment step after the secondary sedimentation step. In the tertiary treatment step the water from the secondary step is subjected to a chemical treatment and to a solid separation process. However, it is not always possible to add a tertiary treatment step to the activated sludge process, because of investment costs and/or lack of physical space. This is a problem especially in existing water treatment facilities using activated sludge processes. In these cases, an alternative solution is to dose treatment chemicals directly to the secondary sedimentation step.

Usually the conditions of the secondary sedimentation step are not, however, optimal for the treatment chemicals, which limit their dosage and efficiency. The conditions of the secondary sedimentation cannot be altered, for example by raising or lowering the pH, as the conditions should be suitable for the useful microorganisms used for removing organic contaminants from the wastewater.

There is a need for a method for improving the quality of the treated water from the secondary sedimentation step of an activated sludge process without extensive and/or expensive modification of the overall process.

SUMMARY OF THE INVENTION

An object of this invention is to minimise or even eliminate the disadvantages existing in the prior art.

An object is also to provide a method with which the quality of the treated water from a secondary sedimentation step can be improved.

Another object is a method which provides an effective way to feed treatment chemicals to an activated sludge process at optimal or near optimal treatment conditions, preferably with minimal disturbance to the useful microorganisms.

These objects are attained with the invention having the characteristics presented below in the characterising part of the independent claim. Some preferable embodiments are disclosed in the dependent claims.

The embodiments mentioned in this text relate, where applicable, to all aspects of the invention, even if this is not always separately mentioned, and the different aspects of the invention are freely combinable.

A typical method according to the present invention for treating wastewater in an activated sludge process, which comprises a biological treatment step, followed by a sedimentation step for separation of sludge and treated water, comprises
  directing a part of the treated water as a backflow from the sedimentation step to the biological treatment step, the backflow having an original pH value;
  adjusting the backflow pH from the original pH value to a first pH value between the sedimentation step and the biological treatment step, and
  adding a coagulant and/or an oxidant to the backflow after the adjustment of the backflow pH to the first pH value and before backflow's entry to the biological treatment step.

Now it has been surprisingly found that the water quality from an activated sludge process can be significantly and unexpectedly improved by directing, i.e. returning, part of the treated water back to the biological treatment step as a backflow, and subjecting this backflow to a chemical treatment with coagulant and/or oxidant chemical before its entry to the biological treatment step. The pH of the backflow can be adjusted to an optimal level for the coagulant and/or oxidant chemical used, and thus improved purification results can be obtained. As the pH adjustment occurs outside the biological treatment step, the disturbance of the biological processes can be minimised or even completely avoided.

In the present invention wastewater, which preferably is industrial or municipal wastewater, is treated in an activated sludge process. The activated sludge process comprises a biological treatment step, where wastewater is treated in at least one aerobic process step, for example in at least one aeration tank, where microorganisms digest organic material in the wastewater and convert it to separable biological sludge. The biological treatment step may also comprise one or more anaerobic process steps, which may alternate with the aerobic process steps. Typically, the pH of the water which contains useful microorganisms, i.e. so-called mixed liquor, in the biological treatment step is in a range of 6-8.5, preferably 6.5-8.

The biological treatment step is followed by a sedimentation step, where the formed biological sludge and treated water are separated from each other. Part of the separated biological sludge is circulated back to the biological treatment step to re-seed the wastewater entering the biological treatment step. According to the present invention a part of the treated water is directed as a backflow from the sedimentation step to the biological treatment step. The backflow has an original pH value, which is the pH of the treated water exiting the activated sludge process. Typically, the original pH value is the same as the pH prevailing generally in the biological treatment step. This means that the original pH value of the backflow is in a range of pH 6-pH 8.5, preferably pH 6.5-pH 8.

The backflow pH is adjusted from the original pH value to a first pH value between the sedimentation step and the biological treatment step. The pH is adjusted to a first pH, which is ideal, or as close to ideal as possible, for the performance of the coagulant and/or oxidant to be used for the backflow treatment. In general, the backflow pH may be adjusted to a first pH value in a range of pH 3.0-6.5, preferably pH 3.0-6.0, more preferably pH 3.5-6.0 or pH 3.5-5.5. According to one embodiment the backflow pH is adjusted to a first pH value in the range of 3-6.5, preferably 4.0-6.5, more preferably 4.5-6.0. The coagulant and/or oxidant is added to the backflow after the adjustment of the backflow pH and before backflow's entry to the biological treatment step. In this manner it is possible to provide optimal working conditions for the coagulant and/or oxidant employed and to improve the water treatment results obtained.

According to one embodiment of the invention <75 vol-%, preferably 10-60 vol-%, more preferably 10-50 vol-% of the treated water exiting the sedimentation step is directed or returned as a backflow to the biological treatment step. This means that the volume of the backflow is preferably larger than zero but less than 75 vol-%, more preferably 10-60 vol-%, even more preferably 10-50 vol-% of the treated water exiting the sedimentation step. The volume of the backflow can be selected on the basis of the properties of the original treated water exiting the secondary sedimentation step and/or the conditions required by the coagulant and/or oxidant used. For example, if the quality of the original treated water, measured as COD value, is clearly exceeding the target level, the volume of the backflow can be increased in order to provide a further treatment for a larger backflow volume. On the other hand, if the backflow is to be treated with an effective coagulant and/or oxidant which requires a first pH significantly deviating from the pH of prevailing in the biological process, it can be advantageous to minimise the volume of the backflow in order to avoid disturbances in the biological process step.

According to one embodiment of the invention the backflow pH is adjusted from the first pH value to a second pH value after the addition of the coagulant and/or oxidant. This is especially beneficial if the first pH significantly deviates from the pH of the biological treatment step. By adjusting the backflow pH to the second pH value makes it possible to return large volumes of water from the sedimentation step to the biological treatment step and/or provides the possibility to use coagulants and/or oxidants which have their optimal operating conditions far removed from the conditions of the biological treatment step. According to one preferable embodiment the backflow pH is adjusted to a second pH value which is within 1 pH unit, more preferably within 0.5 pH unit, from the original pH value. This means that the second pH value may be, for example, in a range of pH 5-pH 9.5, preferably pH 5.5-pH 9. Preferably the backflow pH is within 1 pH unit from the pH value prevailing in the biological treatment step.

The time interval between the addition of the coagulant and/or oxidant and the pH adjustment from the first pH value to the second pH value should be sufficient to allow proper reaction time for the coagulant and/or oxidant. The time interval is dependent on the chemical used and the backflow volume, and can be easily determined by persons skilled in art for each individual case.

The coagulant, which is added to the backflow, may comprise an inorganic metal coagulant, a polymer coagulant or any combination thereof. The inorganic metal coagulant may be an aluminium-based or iron-based inorganic metal coagulant. According to one embodiment of the invention the coagulant comprises inorganic metal coagulant, which is selected from aluminium sulphate, polyaluminum chloride, iron sulphate, ferric chloride or any combination thereof. In addition to the aluminium-based and/or iron-based inorganic metal coagulant(s) also other multivalent compounds may be added to the backflow for improving the effect of the inorganic metal coagulant(s). According to an embodiment of the present invention, the multivalent compound may be a zirconium-based, calcium-based and/or magnesium-based compound.

The inorganic metal coagulant may be added in amount of 1 mol metal ion per 10 g to 1000 g of COD in backflow to be treated.

In case the inorganic metal coagulant comprises an aluminium-based compound, the first pH may be adjusted to pH 4.0-6.5, preferably 4.5-6.0. In case the inorganic metal coagulant comprises an iron-based compound, the first pH may be adjusted to pH 3.0-5.5, preferably 3.3-4.8.

According to one embodiment of the invention the coagulant may comprise a cationic polymer coagulant. The polymer coagulant may be a cationic bio-based polymer coagulant or a cationic synthetic polymer coagulant or any combination thereof. Possible cationic bio-based polymers are cationic polysaccharides, such as starch, cellulose, guar gum, dextran or the like. Suitable bio-based polymers may also comprise chitosan and tannin-based coagulants.

One example of suitable bio-based polymers is cationic starch having a degree of substitution (DS) at least 0.3, preferably at least 0.4. Cationic starch is preferably non-degraded or only slightly degraded and modified solely by cationization. Most preferably the used starch is non-degraded and non-crosslinked. Cationic starch may have quaternary ammonium, quaternary phosphonium, tertiary sulfonium, or other corresponding substituent(s). Suitable cationic starches are of natural origin, for example, potato, rice, corn, waxy corn, wheat, barley, sweet potato or tapioca starch, potato starch being preferred.

According to one embodiment suitable cationic synthetic polymer coagulant may be selected from polyamine, polyvinylamine, polyethyleneimine, polydicyandiamide (poly-DCD), polydiallyldimethylammonium chloride (poly-DADMAC), poly-(acryloyloxyethyl trimethylammonium chloride) (poly-ADAM-Cl), poly(methacryloyl-oxyethyltrimethylammonium chloride) (poly-MADAM-Cl), poly (acrylamido-N-propyltrimethylammonium chloride) (poly-APTAC), poly(methacrylamidopropyl-trimethylammonium chloride) (poly-MAPTAC) and/or from copolymers of (meth)acrylamide and cationic monomers selected from diallyldimethylammonium chloride (DADMAC), [2-(acrylamido)ethyl]trimethylammonium chloride, (ADAM-Cl), [2-(methacrylamido)ethyl]trimethylammonium chloride (MADAM-Cl), [3-(acryloyloxy)propyl]trimethylammonium chloride (APTAC) and/or [3-(meth-acryloyloxy)propyl]trimethylammonium chloride (MAPTAC). According to one embodiment of the present invention, a synthetic cationic coagulant comprises polyamine and/or poly-DADMAC, preferably polyamine. Polyamines have typically higher cationicity as poly-DADMAC and therefore polyamines provide same efficiency by smaller dosage as poly-DADMAC. Polyamines are organic compounds having two or more primary amino groups. Poly-DADMAC is a homopolymer of diallyldimethylammonium chloride (DADMAC).

According to one embodiment both a cationic polymer coagulant and an inorganic metal coagulant are added to the backflow. Simultaneous or successive use of polymer coagulant(s) and inorganic coagulant(s) may enhance coagulation and flocculation of dissolved organic compounds. At least part of the inorganic coagulant(s) may be added prior to addition of the cationic polymer coagulant(s), or alternatively the cationic polymer coagulant may be added simultaneously with the inorganic metal coagulant(s).

Cationic synthetic polymer coagulant may be added in amount of 1 g of active polymer per 1 g to 1000 g of COD in backflow to be treated.

When using cationic coagulant, preferably cationic synthetic coagulant, the first pH value may be adjusted in a range of 3-6.

The oxidant suitable for use in the present invention may be selected from Fenton's reagent, ozone, inorganic or organic peroxy acids, such as peracetic acid, perpropionic acid, performic acid, and chlorine compounds. According to one preferable embodiment the oxidant comprises Fenton's reagent, i.e. a solution of hydrogen peroxide with ferrous iron. The oxidant may be added in amount in amount of 1 mol of active oxidant per 5 g to 100 g of COD in backflow to be treated.

The wastewater to be treated is preferably municipal wastewater and/or industrial wastewater. According to one preferable embodiment the wastewater originates from manufacture of pulp and/or paper.

BRIEF DESCRIPTION OF THE DRAWINGS

An embodiment of the present invention will be described in more detail in the appended FIGURE, where FIG. 1 shows a schematic process chart for one embodiment of the present invention.

DETAILED DESCRIPTION OF THE INVENTION

FIG. 1 shows schematically a process chart for wastewater treatment employing an activated sludge process, where the method according to the present invention is applied. FIG. 1 illustrates one possible non-limiting process embodiment.

In a process illustrated in FIG. 1, wastewater to be treated A is first conveyed to a pre-treatment 1, which can be, for example, a primary sedimentation for removing total suspended solids and other particulate matter from wastewater. After the pre-treatment wastewater is conveyed to a biological treatment 2 comprising an aeration tank 3 for removing majority of dissolved organic matter. The wastewater treatment process may comprise both anaerobic and aerobic treatment tanks or basins or it may comprise only aerobic treatment. In the aeration tank 3 air and/or oxygen is injected in the wastewater. Micro-organisms digest organic matter, also called as an activated sludge process. It is to be understood that the design and layout of the biological treatment may vary depending on the wastewater and/or other conditions.

After the biological treatment 2 the wastewater is conveyed to the sedimentation step 4 for sludge separation. The sedimentation step 4 comprises a solid-liquid separation unit 5, usually referred to as "secondary clarifier", which allows the biological flocs to settle, thus separating the activated sludge from the wastewater. A part of the separated sludge is recycled back to the biological treatment step 2.

Clear filtrate, i.e. treated water, is removed from the sedimentation step. Part of this treated water is circulated back to the biological treatment step 2 as a backflow 6. The backflow pH is adjusted from the original pH value to a first pH value at suitable first location 7 between the sedimentation step 4 and the biological treatment step 2. After the adjustment of the backflow pH a coagulant and/or an oxidant is added to the backflow at a suitable second location 8 before the backflow's 6 entry to the biological treatment step 2.

The following example is merely illustrative of the principles and practices of the present invention and are not intended to limit the scope of the invention.

Example 1

Mixed papermill wastewater was used in Example 1. Main part of wastewater originated from mechanical pulp mill and other parts from paper machine, debarking process and from a coating kitchen. Wastewater was first treated in a primary sedimentation, and the secondary step was a biological activated sludge process. Wastewater for the experiments was taken after the secondary step. Activated sludge used in the experiments was taken from the aeration tank of the activated sludge process.

The experiments were carried out by using Kemira Flocculator 2000 equipment. The experiment comprised two steps.

Step 1

0.5 liter of the sample was subjected to fast mixing for 30 s, speed 400 rpm. pH of the sample was adjusted to pH 4.0 when both 421 ppm $H_2SO_4$ and 600 ppm $Fe_2(SO_4)_3$ (conc. 11.5%) were added. The sample was subjected to slow mixing for 10 min, speed 40 rpm. A 5 ppm dose of cationic polyacrylamide polymer (FennoPol K8980, Kemira) was added. In the end the sample pH was raised to the neutral (pH 7.3) with 188 ppm NaOH.

Step 2

After Step 1 the treated sample was mixed with 0.5 liter of an activated sludge sample (MLSS 6.26 g/l), giving total sample volume of 1 liter. The total sample was aerated for one hour. After aeration the total sample was allowed to settle 1 hour without mixing. Treated effluent sample for analysis was taken from the settled total sample, from the clear zone above the sludge blanket.

The 0.5 liter of reference sample was treated in identical manner as described in Step 2. Treatment in Step 1 was omitted.

Following devices and methods were used for analysis of the treated effluent sample.

UV absorbance measurement at 254 nm, Helios Unicam SN024 spectrophotometer in accordance.

COD measured by dichromate method was analysed using Hach Lange kit tubes and DR390 Photometer. Filtered COD sample was filtered with 0.45 μm filter.

Turbidity was measured by TL2360 Hach Turbidimeter.

Determination of suspended solids in sludge was made according to standard methods using GF/A filter.

The results are shown in Table 1.

TABLE 1

Results of Example 1

| | Treated Sample | Reference Sample |
|---|---|---|
| UV absorbance, 1/cm | 2.272 | 3.181 |
| Turbidity, FNU | 12.5 | 10.9 |
| COD, mg/l | 206 | 279 |
| COD, filtered mg/l | 187 | 256 |

It can be seen form the results of Table 1 that the treated sample shows clearly reduced COD values, which indicates effective removal of organic contaminants, when part of the water from the secondary step is treated and circulated back to the biological treatment step.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A method for treating wastewater in an activated sludge process, which comprises a biological treatment step followed by a sedimentation step for separation of sludge and treated effluent water, the method comprising
    directing a part of the treated effluent water as a backflow from the sedimentation step to the biological treatment step, the backflow having an original pH value;
    adjusting the original pH value of the backflow to a first pH value in a range of 3-6.0, between the sedimentation step and the biological treatment step, and
    adding a coagulant and/or an oxidant to the backflow after adjusting the original pH value of the backflow to the first pH value and before backflow's entry to the biological treatment step.

2. The method according to claim 1, wherein <75 vol of the treated water exiting the sedimentation step is directed as a backflow to the biological treatment step.

3. The method according to claim 1, wherein pH of the backflow is adjusted after the addition of the coagulant from the first pH value to a second pH value.

4. The method according to claim 3, wherein the second pH value is within 1 pH unit from the original pH value.

5. The method according to claim 1, wherein the coagulant comprises an inorganic metal coagulant, a polymer coagulant or any combination thereof.

6. The method according to claim 5, wherein the coagulant comprises inorganic metal coagulant, which is selected from aluminium sulphate, polyaluminium chloride, iron sulphate, ferric chloride or any combination thereof.

7. The method according to claim 5, wherein the coagulant is added in an amount resulting in inorganic metal coagulant in an amount of 1 mol metal ion per 10 g to 1000 g of COD in the backflow to be treated.

8. The method according to claim 5, wherein the coagulant comprises a natural polymer coagulant, which is selected from cationic polysaccharides, chitosan and tannin-based coagulants.

9. The method according to claim 5, wherein the coagulant comprises synthetic polymer coagulant, which is a cationic polymer coagulant selected from polyamine, polyvinylamine, polyethyleneimine, polydicyandiamide (polyDCD), polydiallyldimethylammonium chloride (polyDADMAC), poly (acryloyloxyethyl trimethyl-ammonium chloride) (polyADAM-Cl), poly (methacryloyloxyethyltrimethylammonium chloride) (polyMADAM-Cl), poly (acrylamido-N-propyltrimethylammonium chloride) (polyAPTAC), poly (methacrylamidopropyltrimethylammonium chloride) (polyMAPTAC) and/or a copolymer of (meth)acrylamide and cationic monomers selected from diallyl dimethylammonium chloride (DADMAC), [2-(acrylamido) ethyl]trimethylammonium chloride, (ADAM-Cl), [2-(methacrylamido) ethyl]trimethylammonium chloride (MADAM-Cl), [3-(acryloyloxy) propyl]trimethylammonium chloride (APTAC) and/or [3-(methacryloyloxy)-propyl]trimethylammonium chloride (MAPTAC).

10. The method according to claim 1, wherein the first pH value is in a range of 4.5-6.0.

11. The method according to claim 1, wherein the oxidant is selected from Fenton's reagent, ozone, inorganic or organic peroxy acids and chlorine compounds.

12. The method according to claim 11, wherein the oxidant is added in amount of 1 mol of active oxidant per 5 g to 100 g of COD in the backflow to be treated.

13. The method according to claim 1, wherein the wastewater is municipal wastewater and/or industrial wastewater.

14. The method according to claim 1, wherein the wastewater originates from manufacture of pulp and/or paper.

* * * * *